(12) United States Patent
Kassner

(10) Patent No.: US 7,216,030 B2
(45) Date of Patent: May 8, 2007

(54) METHOD AND DEVICE FOR DETERMINING THE ANGULAR POSITION OF A CRANKSHAFT IN AN INTERNAL COMBUSTION ENGINE

(75) Inventor: Uwe Kassner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/057,316

(22) Filed: Feb. 9, 2005

(65) Prior Publication Data

US 2005/0203695 A1    Sep. 15, 2005

(30) Foreign Application Priority Data

Mar. 11, 2004  (DE) .................... 10 2004 011 807

(51) Int. Cl.
*G06F 19/00* (2006.01)
*G01P 13/00* (2006.01)

(52) U.S. Cl. .................. 701/112; 701/115; 324/165

(58) Field of Classification Search ............... 701/112, 701/114, 115, 116; 324/165
See application file for complete search history.

(56) References Cited

U.S. PATENT DOCUMENTS

| | | | | |
|---|---|---|---|---|
| 5,604,304 | A * | 2/1997 | Kokubo et al. | 73/117.3 |
| 6,034,525 | A * | 3/2000 | Koerner et al. | 324/165 |
| 6,320,374 | B1 * | 11/2001 | Schroeder et al. | 324/165 |
| 6,578,550 | B1 * | 6/2003 | Rupp et al. | 123/406.13 |
| 6,732,713 | B1 * | 5/2004 | Kanazawa et al. | 123/476 |
| 6,907,342 | B1 * | 6/2005 | Matsuoka | 701/113 |

* cited by examiner

*Primary Examiner*—John T. Kwon
(74) *Attorney, Agent, or Firm*—Kenyon & Kenyon LLP

(57) ABSTRACT

A method and a device for determining the angular position of a crankshaft of an internal combustion engine, especially when shutting down the internal combustion engine, using an angle sensor, the passing by being recorded of incremental angle marks on a signal-generating wheel that is connected to the crankshaft in a rotatably fixed manner, and being transmitted in the form of signals to an engine control unit. The signals include data on the direction of rotation of the crankshaft, and the direction of rotation data is evaluated in the engine control unit.

11 Claims, 2 Drawing Sheets

Fig. 3
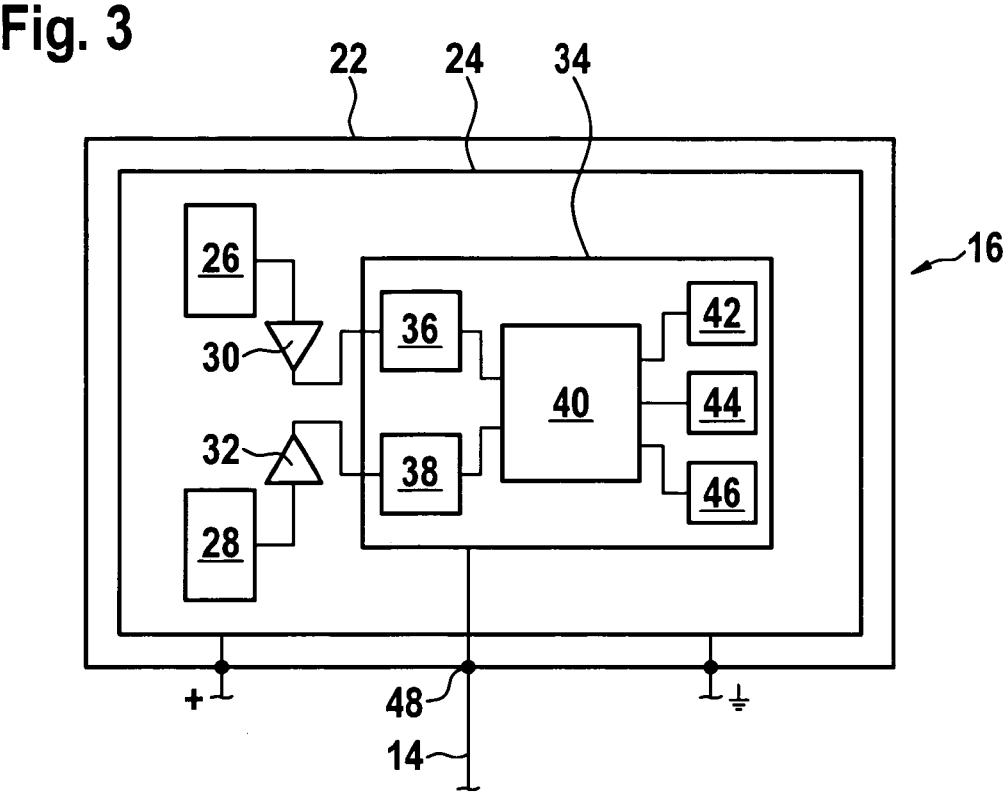
Fig. 4a
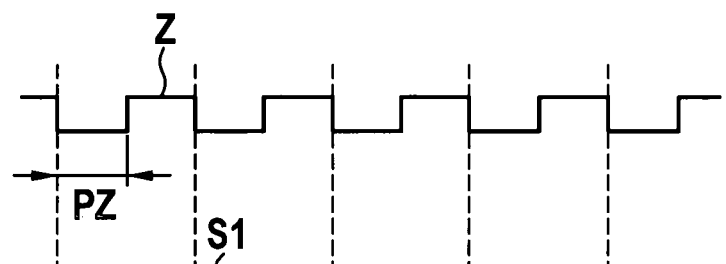
Fig. 4b
Fig. 4c
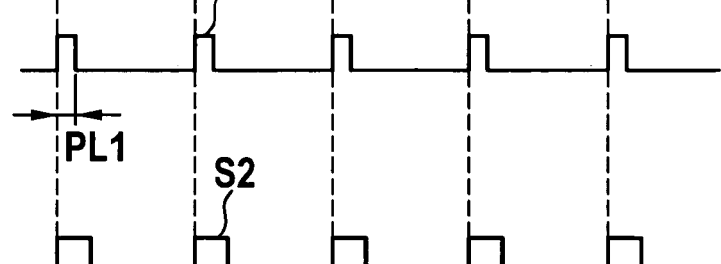
Fig. 4d
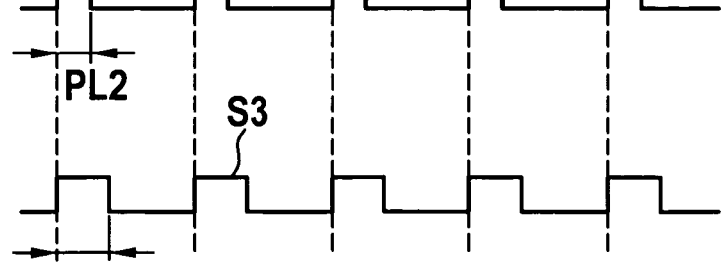

METHOD AND DEVICE FOR DETERMINING THE ANGULAR POSITION OF A CRANKSHAFT IN AN INTERNAL COMBUSTION ENGINE

BACKGROUND INFORMATION

The determination of the angular position of the crankshaft of internal combustion engines in motor vehicles is of great importance for the engine control, since, among other things, the point in time of fuel injection, and, in Otto engines, the point in time of ignition of the fuel/air mixture, in each cylinder is controlled as a function of the angular position of the crankshaft in such a way that optimum efficiency is ensured. For the determination of the angular position of the crankshaft, as a rule, incremental angle sensors are used that include an angle sensor for recording the passing by of angle marks on a signal-generating wheel that is rotatably fixed to the crankshaft. The angle marks are mostly made up of discrete teeth that radially protrude from the signal-generating disk, which, when they pass by, induce voltage signals in the sensor. These so-called tooth signals are transmitted to the engine control unit of the internal combustion engine and are evaluated there, in order to determine the current angular position of the crankshaft, and besides that, to determine the current rotary speed of the internal combustion engine via the signal frequency.

For the additional improvement of the engine control, it would be of advantage also to record accurately the angular position of the crankshaft when shutting down the internal combustion engine. If this were done, by having exact knowledge of the angular position of the crankshaft, one could substantially speed up the subsequent start of the internal combustion engine, which would be of advantage with respect to convenience and exhaust gas emissions. However, using the tooth signals transmitted at the present time by the angle sensor, the engine control unit is not in a position to fulfill this object because, when the internal combustion engine is shut down, before its final standstill, not all that rarely, there is a swinging motion, i.e. a reversal in the direction of rotation of the crankshaft happening one or more times, which prevents an exact determination of its angular position from the tooth signals.

SUMMARY OF THE INVENTION

The method according to the present invention and the device according to the present invention offer the advantage that, by evaluating the rotary direction data included in the signals, the angular position of the crankshaft, even during a reciprocating motion of the crankshaft, may be securely derived at any point, which makes possible an exact statement on its angular position during a standstill.

To obtain data on the direction of rotation, the angle sensor expediently has two sensors, offset with respect to the signal-generating wheel and situated in close proximity of one another, which record, one after the other, the passing by of the angle marks or teeth of the signal-generating wheel, and which permit, by the relationship of the signals generated in this context, determining the direction of rotation of the crankshaft, using a signal processing device integrated into the angle sensor. The two sensors are preferably designed as active sensors, whose functioning is based on the Hall effect or the magnetoresistive effect.

Although it would basically be possible to transmit the rotation direction data, obtained with the aid of the angle sensor, separately from the tooth signals via a separate line to the engine control unit, this solution is not preferred because, besides this additional line between the engine control unit and the angle sensor, it also requires an additional input and output on the same, which would lead to relatively high costs because of the change in the sensor manufacture.

According to one preferred embodiment of the present invention, it is provided for this reason that the direction of rotation data be transmitted to the engine control unit, in the form of modified tooth signals, which have a different pulse length as a function of the direction of rotation of the crankshaft. In other words, a first specified pulse length of the signals means a right-ward rotation of the crankshaft, while a left rotation of the crankshaft is coded by a second specified pulse length of the signals. In the case of the transmitted signals, preferable square-wave signals are involved, which are derived by the signal processing device in the angle sensor from the signals of the two sensors. The pulse length of the signals, in this context, is understood to mean the time duration of the signal at high level, or optionally also at low level.

Since, in the case of this solution, neither an additional line between the angle sensor and the engine control unit, nor additional inputs and outputs on these are required, the already present electrical connection between the angle sensor and the engine control unit is sufficient for signal transmission, and also, the present housing of the angle sensor may be used unchanged. The corresponding applies also to the signal processing in the engine control unit if the beginning of the signals coincides with that edge of each tooth signal that is usually evaluated in the engine control unit. As a rule, this is the falling tooth edge which, because of its greater accuracy, is normally used for triggering the so-called tooth interrupt, which controls the further signal processing. The respectively other tooth edge is suppressed and does not effect a change in the signal level, which is triggered only after the end of the respective pulse length by the signal processing device.

Another preferred embodiment of the present invention provides that the signals may have a third specified pulse length that is different from the first and the second specified pulse length. This third pulse length is emitted when the signal processing device in the angle sensor receives implausible signals from the two sensors, from which it cannot derive a clear direction of rotation, such as the appearance of a change in edges at only one of the two sensors.

The specified pulse length of the signals transmitted to the engine control unit is given to these signals in the signal processing device of the angle sensor, which, for this purpose, includes at least one timing device for each pulse length, for instance, in the form of a monoflop circuit or of a clock pulse generator that forms a part of the signal processing device of the angle sensor that is designed preferably as an integrated circuit.

Expediently, the different pulse lengths are established in such a way that certain differentiation between them is possible. Furthermore, expediently all pulse lengths are shorter than the pulse length of a tooth signal induced in the angle sensor by highest rotary speed of the crankshaft that is to be expected, so as to make possible a clear evaluation of the direction of rotation data even at high signal frequencies, or so as to avoid overlapping of consecutive signals. However, alternatively to this, it is also possible to emit signals whose pulse lengths are greater than the pulse length of a tooth signal induced in the angle sensor at the highest rotary speed of the crankshaft that is to be expected, however, to emit these signals only up to a predefined speed, at which a reverse direction of rotation of the engine may certainly be excluded. Above this speed then, expediently the tooth signals generated by a sensor are transmitted without previous modification of its pulse lengths by the signal processing device.

As was mentioned before, the signals transmitted to the engine control unit are made up of a sequence of alternating high level signal states and low level signal states, whose signal duration in the engine control unit is recorded and evaluated, in order to determine the current direction of rotation of the crankshaft. This, in turn, is used in a suitable counter of the engine control for determining the exact crankshaft position, in that the counter increases the counter reading by the angular distance of the angle marks or teeth of the signal-generating wheel during a rotation to the right, and, during a rotation to the left by the crankshaft, it decreases the counter reading by the same angular distance. In case of a reversal of the direction of rotation, half the angular distance of the angle marks of the signal-generating wheel is added or subtracted, in order to take into consideration the displacement of the falling edge. Expediently, the counter of the engine control unit is synchronized after every start of the internal combustion engine with the angular position of the crankshaft, for which the already present tooth gap of the signal-generating wheel may be used.

BRIEF DESCRIPTION OF THE DRAWINGS

FIG. 3 shows a simplified schematic block diagram of components of the angle sensor.

FIG. 4a shows a representation of a sequence of tooth signals generated in the angle sensor.

FIG. 4b shows a representation of a sequence of signals transmitted by the angle sensor to the engine control unit at the normal direction of rotation of the internal combustion engine.

FIG. 4c shows a representation of a sequence of signals transmitted by the angle sensor to the engine control unit at the reverse direction of rotation of the internal combustion engine.

FIG. 4d shows a representation of a sequence of signals transmitted by the angle sensor to the engine control unit at an undefined direction of rotation of the internal combustion engine.

DETAILED DESCRIPTION

Figure 1:
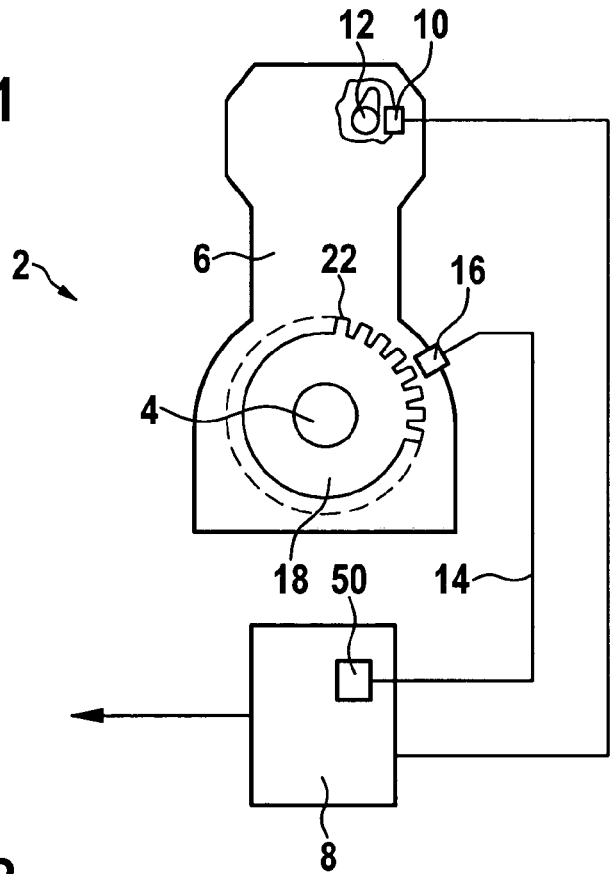
FIG. 1 shows a schematic representation of a device according to the present invention, having an angle sensor and an engine control unit.
Figure 2:
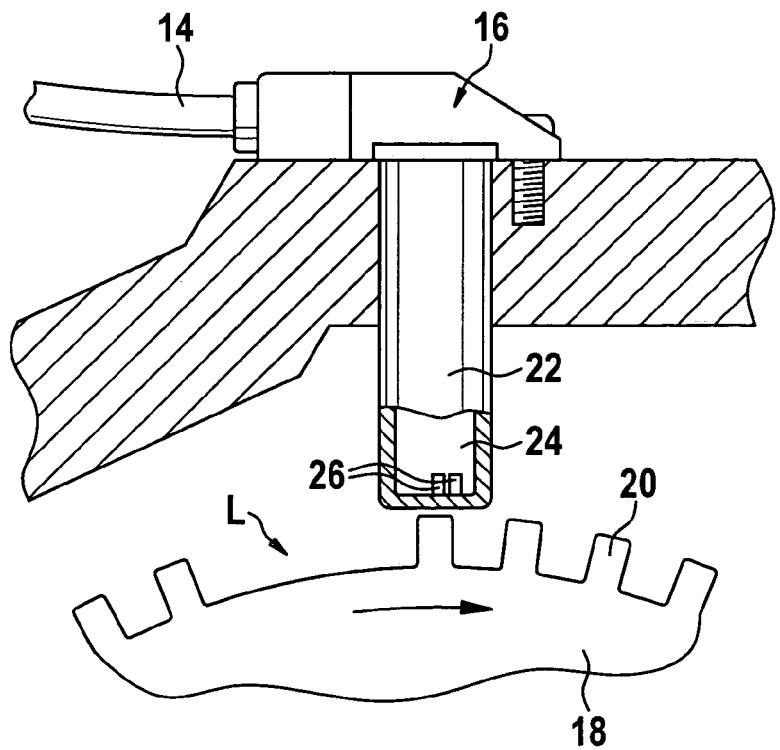
FIG. 2 shows an enlarged, detailed view of the cutout from FIG. 1 marked by X.

Device 2, shown in FIGS. 1 to 3, is used, among other things, for the exact determination of the current angular position of a crankshaft 4 of an internal combustion engine 6, as well as for ascertaining the engine's rotary speed. Device 2 is made up essentially of an engine control unit 8 of internal combustion engine 6, a phase sensor 10 at camshaft 12 of internal combustion engine 6, as well as an angle sensor 16 that is connected to engine control unit 8 via a single signal transmitting line 14, and that is placed in the vicinity of signal-generating wheel 18, which is mounted rotatably fixed on crankshaft 4. Signal-generating wheel 18 is outfitted at its outer circumference with a row of angle markers in the form of fifty-eight teeth 20, which are situated at equal angular distances, and have a gap L at one location at which two teeth 20 are missing (FIG. 2).

As shown best in FIGS. 2 and 4, angle sensor 16 has a closed housing 22, which internally accommodates an integrated circuit 24. This integrated circuit 24 includes two angle sensors 26, 28 in the form of Hall elements offset with respect to each other, at which teeth 20 of signal-generating wheel 18 pass by at a short distance. Upon the passing by of the tooth edges of teeth 20, the voltage induced in Hall elements 26, 28 changes, so that a sequence of analog signals is generated by each Hall element 26, 28. These signals are amplified respectively in a post-connected amplifier 30, 32 of integrated circuit 24, and are supplied thereafter to a signal processing unit 34 of integrated circuit 24.

Signal processing unit 34 includes two Schmitt triggers 36, 38, in which the analog signals of Hall elements 26, 28 are converted into tooth signals Z in the form of rectangular pulses, as shown in FIG. 4a, one logic circuit 40 for determining the current direction of rotation of crankshaft 4 from tooth signals Z, as well as three time sensors 42, 44, 46, with the aid of which the pulse length PZ of tooth signals Z is modified and set to a predefined length PL1, PL2 or PL3 as a function of the direction of rotation of crankshaft 4, as shown in FIGS. 4b, 4c and 4d.

In logic circuit 40 it is determined at which of the two Hall elements 26, 28 the rear tooth edge of each tooth 29 of signal-generating wheel 18 passes first, by evaluating the relative relationship of the tooth edges of tooth signal Z of the two Hall elements 26, 28. In this context, it is checked whether, upon the passing by of the rear tooth edge of a tooth 20 at a Hall element 26, the tooth signal of the other Hall element 28 is still in the low level state or is already in the high level state. Basically, both the front and the rear edge of teeth 20, corresponding to the rising edge or the falling edge of tooth signals Z, could be made the basis of the evaluation, but, in general, because of greater accuracy, the latter is preferred.

After the evaluation of the relative relationship of the tooth edge of tooth signals Z of the two Hall elements 26, 28, a single sequence of signals S1, S2 or S3 is generated by signal processing unit 34, whose rising edges, taking into consideration the signal propagation times, coincide in each case exactly with the falling edges of the sequence of tooth signals Z (FIG. 4a) used for the evaluation, and whose pulse length PL1, PL2 or PL3 are a function of the ascertained current direction of rotation of crankshaft 4 by the suppression of the rising edges of signal sequence in FIG. 4a. For example, Signals S1, S2, S3 of the signal sequence, in the case of the usual rotation to the right of crankshaft 4, have the pulse length PL1 shown in FIG. 4b, in a rotation to the left, the pulse length PL2 shown in FIG. 4c, and in the case of an implausibility they have the pulse length PL3 shown in FIG. 4d. In the exemplary embodiment shown, pulse length PL2 of signals S2 amounts to double the pulse length PL1 of the signals S1, and the pulse length PL3 of signals S3 amounts to triple PL1, so as to make possible a certain differentiation between the signals S1, S2, S3 in engine control unit 8. However, signals S1, S2, S3 are not limited to these pulse lengths PL1, PL2 and PL3. In addition, the greatest pulse length PL3, in the case of the maximum speed of crankshaft 4 that is to be expected, is shorter than pulse length PZ of tooth signals Z shown in FIG. 4a, so as to constantly avoid overlapping of the pulses.

However, this does not necessarily have to be the case, since signals S1, S2, S3 are able to have greater pulse lengths PL1, PL2 or PL3 without danger of overlapping if signals S1, S2, S3, having the coded direction of rotation data, are transmitted only up to the reaching of a predetermined pulse frequency or crankshaft rotary speed, such as 1000 rev/min. The advantage of these greater pulse lengths is a greater protection from interference, because, by contrast to very short pulses, they are able to be distinguished better from coupled-in interference signals from electrical fields and adjacent electrical lines. Since the crankshaft is always in a rotation to the right above the predefined pulse frequency or rotary speed, one may do entirely without a transmission of the direction of rotation data in that range, and instead of signals S1, S2 or S3, the generated tooth signals Z may be transmitted, as in the case of conventional angle sensors.

The signal sequence generated is transmitted via a single signal output 48 of angle sensor 16 and signal transmission line 14 to engine control unit 8, where, in addition to the signal frequency of the signal sequence that is already being evaluated in conventional engine control units, the respective pulse lengths PL1, PL2, PL3 of signals S1, S2 or S3 are also ascertained, in order to make possible a determination of the exact angular position of crankshaft 4 by the evaluation of the direction of rotation data in actual time, contained therein.

For this purpose, engine control unit 8 includes a counter 50, which concludes from a pulse length PL1 that there is a rotation to the right by crankshaft 4, and increases the counter reading by 6 degrees in response to each signal S1, whereas it concludes from a pulse length PL2 that there is a rotation to the left by crankshaft 4 and decreases the counter reading by 6 degrees in response to each signal S2. In response to each reversal of the direction of rotation, an increment of 3 degrees is added or subtracted, in order to take into consideration a shift in the falling edge of the signals. Thereby, when shutting down internal combustion engine 6, one may exactly determine the angular position of crankshaft 4 at standstill, and in this manner speed up the next start of engine 6, this having effects on comfort and exhaust gas emissions. In response to a signal having pulse length PL3, counter 50 is reset to zero, and, just as at each start of engine 6, is synchronized again with crankshaft 4, with the aid of tooth gap L.

What is claimed is:

1. A method for determining an angular position of a crankshaft of an internal combustion engine, using an angle sensor, the method comprising:
   recording a passing-by of incremental angle marks on a signal-generating wheel that is connected rotatably fixed to the crankshaft;
   transmitting the passing-by to an engine control unit of the internal combustion engine in the form of signals, at least a part of the signals including data on a direction of rotation of the crankshaft, wherein the direction of rotation data is coded by different pulse lengths of the signals as a function of the direction of rotation of the crankshaft, and wherein the signals are transmitted via a single line to the engine control unit; and
   evaluating the direction of rotation data included in the signals in the engine control unit.

2. The method according to claim 1, wherein the angular position is determined when shutting down the engine.

3. The method according to claim 1, wherein the signals have at least two different pulse lengths, a first pulse length being at a normal direction of rotation of the crankshaft, and a second pulse length being different from the first pulse length when there is a reversed direction of rotation of the crankshaft.

4. The method according to claim 3, wherein the signals have a pulse length that is different from the first and the second pulse length if the angle sensor does not recognize a clear direction of rotation.

5. The method according to claim 3, wherein all of the pulse lengths are shorter than a pulse length of angle mark signals, which are generated in the angle sensor at a highest rotary speed to be expected of the crankshaft upon the passing-by of the angle marks.

6. The method according to claim 1, wherein the signals including the direction of rotation data are transmitted only below a predetermined maximum rotary speed of the crankshaft.

7. The method according to claim 1, wherein the signals are made up of alternating high level and low level signal states, and further comprising evaluating, in the engine control unit, a time duration of one of the high level and the low level signal states for a determination of the direction of rotation of the crankshaft.

8. A device for determining an angular position of a crankshaft of an internal combustion engine, comprising:
   an engine control unit of the internal combustion engine;
   an angle sensor in a vicinity of a signal-generating wheel that is connected to the crankshaft in a rotatably fixed manner, which records a passing-by of incremental angle marks on the signal-generating wheel and transmits the passing-by in the form of signals to the engine control unit, the signals including data on a direction of rotation of the crankshaft; and
   a single line for transmitting all of the signals between the angle sensor and the engine control unit;
   wherein the engine control unit includes equipment for evaluating the direction of rotation data included in the signals, and wherein the direction of rotation data is coded by different pulse lengths of the signals as a function of the direction of rotation of the crankshaft.

9. The device according to claim 8, wherein the angular position is determined when shutting down the engine.

10. The device according to claim 8, wherein the angle sensor includes two sensors situated offset with respect to the signal-generating wheel, and a signal processing device, which derives from the signals of the two sensors the direction of rotation of the crankshaft, and sets a pulse length of the signals to a value corresponding to the derived direction of rotation.

11. The device according to claim 10, wherein the signal processing device includes at least one time sensor which confers on the signals a pulse length that is a function of the direction of rotation of the crankshaft.

* * * * *